INVENTOR
ALBERT DIECKMANN
BY
ATTORNEY

Patented May 31, 1949

2,471,865

UNITED STATES PATENT OFFICE 2,471,865

DUAL BRAKE ADJUSTING MECHANISM

Albert Dieckmann, Normandy, Mo., assignor to Wagner Electric Corporation, St. Louis, Mo., a corporation of Delaware Application May 3, 1945, Serial No. 591,668

10 Claims. (Cl. 188—79.5)

1

This invention relates to automotive type brakes and in its more specific aspects is directed to an adjustment mechanism for dual brakes.

The object of this invention is to provide a structure for simultaneously adjusting each of the pairs of brake shoes of a dual brake.

Another object of the invention is to provide a dual wedge adjustment for a dual brake in which the degree of adjustment of each of the pairs of brake shoes is substantially equal.

A further object of the invention is to provide an adjustment for a dual brake which has means therein to cause the same adjustment to take place in each of the shoes for any movement of the adjusting screw.

Another and further object of the invention is to provide an adjustment for dual brakes having a double wedge in which means are provided to prevent shifting of the wedges with respect to the pairs of brake shoes of the dual brakes.

Other and further objects of the invention will occur to those skilled in the art to which this application pertains as the description proceeds, which, taken in connection with the accompanying drawings, sets forth a preferred embodiment of the invention but such disclosure is not to be construed as a limitation of the invention which is limited only by the appended claims and any and all modifications, alterations and variations of structure coming within the spirit and scope thereof are deemed to be included herein.

Various expedients have been adopted in the brake art to effect the adjustment of dual brakes and several attempts have been made to provide structures whereby the same adjustment would take place in one shoe as in the other. These several devices have failed for the reason that up until the instant invention no satisfactory and completely operative structure has been provided for confining the adjusting movement of each portion thereof to the respective shoes and of equalizing the movement of the adjusting means to the respective brake shoes. This invention seeks to overcome the objections to the prior art by providing the adjusting means with devices to equalize the movements of the several adjusting means and to confine the movements

2 of each of the several devices to the respective shoe elements.

The objects and advantages set forth above are obtained in the structure shown in the accompanying drawings in which 1 and 2 are portions of one set of tandem or parallel brake shoe elements and 3 and 4 are portions of the cooperating set of brake shoe elements of a dual brake assembly.

Figure 1:
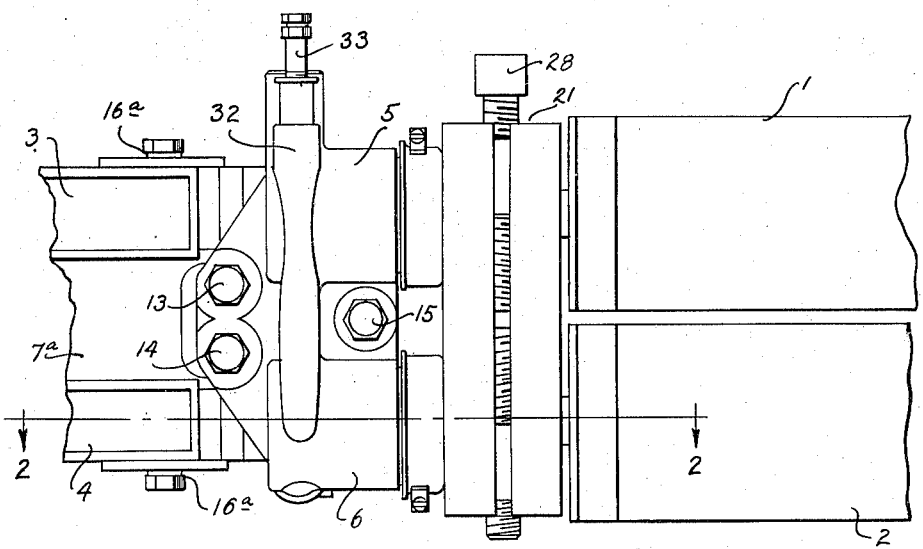
Figure 1 is a plan view of the dual brake adjusting mechanism.
Figure 2:
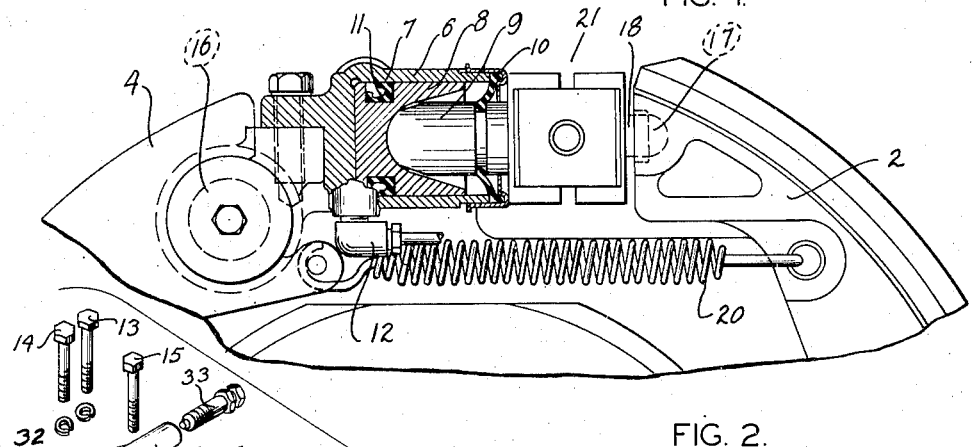
Figure 2 is a sectional view taken substantially along the line 2—2 of Figure 1.

Each of the pairs of brake shoes 1, 3 and 2, 4 is operated by individual motors 5 and 6 conventional in character, one of which is illustrated in Figure 2 in which a cylinder 7 is provided having a piston 8 therein with which a piston rod 9 is operatively associated and having a flexible protecting element 10 therein to prevent the ingress of grit or other foreign matter which would be destructive to the interior of the brake cylinder 7. Piston 8 is provided with a seal 11 and a fixture 12 is connected with the interior of the brake cylinders, said cylinders and fixture having a duct therein connectable to the power side of the piston or ahead of seal 11. Fixture 12 is connected to the usual master cylinder customarily found on hydraulic equipment for the operation of the several brake cylinders. The brake motors 5 and 6 are secured to a spider 7a by screw elements 13, 14 and 15 extending through a suitable bracket to which motors 5 and 6 are integrally secured. The heel ends of the shoes are anchored to spider 7a by pin means 16 held in the spider by screw and washer elements 16a.

The shoes 1 and 2 are appropriately socketed as at 17 to receive pins 18 and 19 having hemispherical ends received in sockets 17. A retracting spring 20 is connected between the several shoes 1, 3 and 2, 4 to withdraw the shoes from the friction surface of the drum with which the shoes are adapted to engage.

Figure 3:
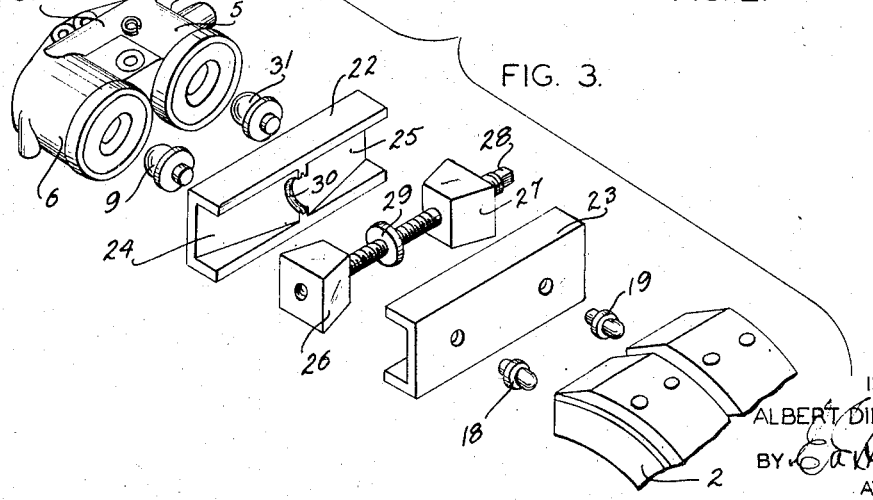
Figure 3 shows an exploded view of the adjusting means.

Extending between the several pairs of shoes and the brake motors 5 and 6 is an adjusting means indicated generally at 21. This adjusting means comprises a double wedge member consisting of two elements 22 and 23. Each of these elements is provided with diverging contact faces 24 and 25, as shown in Figure 3, and part 23 is provided with the same kind of contact faces that diverge in the same manner. Cooperating with faces corresponding to face 24 is a wedge member 26 and another wedge member 27 cooperates with the faces corresponding to face 25. A screw 28 on which the two wedges 26 and 27 are mounted is equipped with right aand left hand threads to cause the wedges to move either inwardly toward each other or away from each other simultaneously, depending upon the direction in which the screw 28 is rotated. Substantially midway of the screw is a collar element 29 which engages with a semi-circular slot 30 formed midway of the length of each of the wedge members 22 and 23. The disc or collar 29 fits into slots 30 and maintains the two wedge members 26 and 27 in the same relative position on faces 24 and 25 at all times. The members 18 and 19, which engage with socket 17, are rigidly fixed in suitable apertures in wedge member 23, and piston rods 9 and 31 are also fixed in suitable apertures provided in the wedge 22. The wedges 22 and 23 that receive pins 18 and 19 and piston rods 9 and 31 are operatively engaged with the adjusting members 26 and 28 to adjust same with respect to the brake shoes and allow a certain amount of motion relatively radially of the brake assembly but prevent the wedge elements 22 and 23 from shifting relatively to each other and to the ends of the shoes. It is evident, therefore, that the shoe elements will be radially adjusted whenever the screw element 28 is rotated and since collar 29 cooperates with slot 30, the alignment of wedges 26 and 27 with respect to faces 24 and 25 will be maintained constant to thereby provide an equal adjustment for each of the pairs of brake shoe elements. When members 26 and 27 are rotated relatively to each other, shoes 1 and 2 may be brought into parallel alignment. Shoes 3 and 4 are adjusted at their toe ends by a similar double wedge construction.

Brake motors 5 and 6 have a bracket 32 provided thereon with a bore therein (not shown) connected to each of the brake motors and has a bleeding device 33 connected thereto by means of which entrapped air may be bled from the brake motors or fluid may be pumped therefrom in the usual manner.

Having fully described my invention, that which I claim as novel and desire to protect by Letters Patent of the United States is:

1. In a dual brake, an adjusting means; a pair of brake shoes arranged in tandem; means to actuate said brake shoes to expand same into engagement with a brake drum; means to adjust each shoe in said pair of shoes, said means comprising a dual wedge construction operatively associated with said brake operating means and the brake shoes, said means including fixed dual divergently faced wedge members, one wedge member for each shoe of said pair of shoes; adjustable dual faced wedge members cooperating with same, one wedge member adjusting one shoe and the other wedge adjusting the other shoe of said pair of brake shoes; screw means to move said adjustable wedge members relatively to each other; and means to equalize the movements of said adjustable wedge members with respect to each other.

2. In a dual brake assembly, adjusting means; a pair of brake shoes arranged in tandem; means to expand said shoe elements into engagement with a cooperating drum; means to adjust said shoes which includes a pair of fixed wedge elements having diverging faces thereon, one face for each shoe, one of said wedge elements operatively associated with said shoe expanding means and the other operatively associated with said shoe means; a pair of adjustable wedge elements having diverging faces thereon cooperating with said fixed elements, one wedge member adjusting one shoe and the other wedge adjusting the other shoe of said pair of brake shoes; a screw means on which said adjustable wedge elements are mounted and said screw having right and left hand threads thereon to simultaneously move said adjustable wedges toward or away from each other; means on said screw to center said adjustable wedges with respect to said fixed wedges; and means to connect said brake operating means with said other pair of brake shoe elements.

3. In an adjusting means for dual brakes, a pair of tandem brake elements; a pair of brake cylinders to move said shoes into engagement with a cooperating brake drum; means to introduce pressure fluid to said brake motors; a fixed wedge member operatively associated with each of said brake motors; a second fixed wedge member operatively associated with one end of each pair of said brake shoes; each of said wedge members having diverging faces, one set of faces for each brake element; an adjustable set of wedge members having diverging faces cooperating with the diverging faces of said fixed members, one wedge member adjusting one brake element and the other wedge adjusting the other brake element of said pair; a right and left hand threaded screw member on which said adjustable members are associated, each of said fixed wedge members having a centrally disposed slot therein; and a collar member on said screw cooperating with said slots to maintain the wedge members on said screw centralized with respect to said brake cylinders and said brake shoes.

4. In a dual brake adjusting means, a pair of tandem brake shoe elements; a pair of brake motors operatively associated with one end of each shoe in said pair of brake shoes; means whereby pressure fluid is admitted to said brake cylinders; adjusting means disposed between said brake cylinders and the ends of the brake shoes, said adjusting means including a pair of fixed members having diverging cam faces thereon and centrally disposed slots therein, one set of cam faces for each shoe in said pair of shoes; means to associate one of said wedge members with the ends of the cooperating pair of brake shoe members; a pair of adjustable wedge members cooperating with said face elements; a screw element having right and left hand threads thereon to adjust said wedge elements toward or away from each other on said screw; and means on said screw engageable with said slots to equalize the adjustment of said movable wedge elements with respect to said brake motors and the cooperating ends of said brake shoes.

5. In a brake shoe adjusting means, a pair of brake shoes arranged in tandem; actuating means for said shoes; a first double wedge member associated with said actuating means; a second double wedge member associated with said shoes; the inclined faces on each double wedge member oppositely disposed, one face of each double wedge member operative upon one shoe in said pair; an adjusting screw disposed between said members; a wedge member on each end of said adjusting means cooperating with each pair of oppositely disposed wedge faces, each wedge member on said adjusting means acting upon one shoe of said pair of brake shoes; and means on said screw cooperating with said first and second double wedge members to keep the wedge members on said screw equidistant from the centers of said double wedge members.

6. In a brake adjusting means, a pair of brake shoes arranged in tandem; actuating means for said shoes; a first double wedge member associated with said actuating means; a second double wedge member associated with said shoes; said members disposed opposite each other; each of said wedge members having diverging wedge faces thereon with the faces on each member disposed opposite each other and acting on one shoe of said pair of shoes; an adjusting screw; wedge members near each end of the screw having faces complemental to those on the double wedge members, said double wedge members simultaneously movable toward and away from each other to adjust the double wedge members upon rotation of said screw, one double wedge member acting upon one shoe of each pair of shoes; and when the wedge members are rotated relatively to each other adjusting the ends of the double wedge members with respect to each other.

7. In a brake adjusting means, a pair of brake shoes arranged in tandem; means to actuate said shoes; a first double wedge member operatively associated with said shoes; a second double wedge member operatively associated with said means; said members disposed opposite each other; said members having diverging faces disposed opposite each other and acting upon one shoe in said pair of shoes; an adjusting screw between said members; wedges on each end of said screw having wedge faces complemental to the faces on said double wedge members, one double wedge member acting upon one shoe in said pair of shoes; said wedges on said screw moving simultaneously toward or away from each other upon rotation of said screw to move said double wedge members toward or away from each other; the ends of said double wedge members adjusted relative to each other when said wedges are moved relatively to each other on said screw; and means on said screw engageable with each of said double wedge members to keep said wedges equidistant from the centers of said double wedge members.

8. A dual brake comprising a pair of brake shoes arranged in tandem; means to actuate said brake shoes into engagement with a brake drum; a pair of dual wedge members disposed between said means and said pair of brake shoes; a pair of complemental wedges operatively associated with said dual wedges, one of said complemental wedges acting upon one shoe and the other complemental wedge member acting upon the other shoe of said pair of shoes; means to simultaneously move said complemental wedges toward and away from each other to thereby substantially radially move said brake shoes; and means on said last mentioned means operatively associated with said dual wedge members to maintain said complemental wedges centered with respect to said dual wedge members.

9. In a brake adjusting mechanism, a pair of tandem brake assemblies, each comprising a plurality of brake shoes; means to expand the brake shoes into engagement with a cooperating drum; means to adjust said shoes relative to each other and to the cooperating drum, said means including a complemental double wedge structure and cooperating wedges, one wedge structure arranged in each brake assembly; means to simultaneously move said wedges with respect to said double wedge structure to thereby simultaneously adjust each assembly; and interlocking means to centralize said wedges with respect to said double wedge structure so that said assemblies will be uniformly adjusted.

10. In a brake adjusting mechanism, a pair of tandem brake assemblies, each assembly including a plurality of brake shoes; means to expand the brake shoes into engagement with a cooperating brake drum; means to adjust said shoes relative to each other and to the cooperating brake drum, said means including a complemental double wedge structure and cooperating wedges, one wedge structure disposed in each brake assembly; and means to simultaneously move said wedges with respect to said double wedge to thereby equally and simultaneously adjust the shoes in each assembly relative to the brake drum.

ALBERT DIECKMANN.

REFERENCES CITED

The following references are of record in the file of this patent:

UNITED STATES PATENTS

| Number | Name | Date |
| --- | --- | --- |
| 1,844,496 | Blume | Feb. 9, 1932 |
| 1,941,965 | Albert | Jan. 2, 1934 |
| 1,994,820 | Herve | Mar. 19, 1935 |
| 2,198,878 | Main | Apr. 30, 1940 |
| 2,366,946 | Whitacre | Jan. 9, 1945 |